United States Patent [19]

Sato et al.

[11] 4,151,552

[45] Apr. 24, 1979

[54] AUTOMATIC BEAM CONTROL CIRCUIT RESPONSIVE TO AMBIENT LIGHT LEVEL HAVING UTILITY IN COLOR TELEVISION CAMERA

[75] Inventors: Kazuhiro Sato, Tokyo; Naoki Ozawa; Shusaku Nagahara, both of Kokubunji, all of Japan

[73] Assignee: Hitachi, Ltd., Japan

[21] Appl. No.: 923,193

[22] Filed: Jul. 10, 1978

Related U.S. Application Data

[63] Continuation of Ser. No. 795,510, May 10, 1977, abandoned.

[30] Foreign Application Priority Data

May 21, 1976 [JP] Japan .................................. 51-85082
Jul. 19, 1976 [JP] Japan .................................. 51-57801

[51] Int. Cl.² .......................... H04N 9/04; H04N 5/34
[52] U.S. Cl. ....................................... 358/41; 358/219

[58] Field of Search ................................. 358/41, 219

[56] References Cited

U.S. PATENT DOCUMENTS 3,988,776 10/1976 Shinozaki et al. ..................... 358/41

Primary Examiner—Robert L. Richardson
Attorney, Agent, or Firm—Craig & Antonelli

[57] ABSTRACT

An image pickup apparatus provided with a circuit for taking the maximum one of the three signal currents out of three photoconductive pickup tubes and a circuit for obtaining the difference of the maximum signal current from a current proportional to one of the cathode currents of the three pickup tubes, wherein the voltages at the beam control electrodes of the three pickup tubes are controlled together by the voltage signal corresponding to the difference current so that the resolutions of the pickup tubes are improved and that the scanning beam control circuit is simplified.

21 Claims, 15 Drawing Figures

AUTOMATIC BEAM CONTROL CIRCUIT RESPONSIVE TO AMBIENT LIGHT LEVEL HAVING UTILITY IN COLOR TELEVISION CAMERA

This is a continuation of application Ser. No. 795,510, filed May 10, 1977 and now abandoned.

The present invention relates to an image pickup apparatus and more particularly to a television camera apparatus having photoconductive pickup tubes provided with scanning beam control circuit(s).

Photocondctive tubes such as a vidicon and a plumbicon, used in a television camera apparatus, generally have narrow dynamic range and are not adapted for the image pickup of an object having a high contrast as in the outdoors. The reason is as follows. Since the resolution of the pickup tube such as mentioned above is degraded with the increase in beam current, sufficient beam current cannot be provided and therefore beam current is often low especially in case a bright object is to be picked up.

In order to solve the above problem, the inventors have created a circuit for producing a current equivalent to the return beam current (i.e. scanning beam current minus the current absorbed as a video information signal current by the photoconductive layer) and realized an image pickup apparatus having a dynamic range larger than that of a conventional image pickup tube of fixed beam current type. The image pickup apparatus will be described in detail later for better understanding of the present invention.

A beam current control circuit for each pickup tube consists of a circuit for dividing the cathode current of the pickup tube; a circuit for taking a signal current out of a target electrode, i.e. photoconductive layer; a subtracting circuit for obtaining the difference between the cathode current and the signal current; a differential amplifier for comparing the output of the subtractor with a reference current; and a circuit for supplying the output of the amplifier to the beam current control electrode.

In general, either plural image pickup tubes are needed to obtain color television signals, or in order to obtain color television signals with a single pickup tube, plural signals must be derived from the target of the tube. Accordingly, for the purpose of the above described beam current control, separate control circuits, equal in number to the pickup tubes to be used, are needed. This goes counter to the requirement that the image pickup apparatus should be reduced in size and simplified in structure.

The main object of the present invention is to simplify the structure of a television camera apparatus using photoconductive pickup tubes without narrowing the dynamic range.

Another object of the present invention is to make a single beam control circuit capable of controlling the beam currents of plural pickup tubes or the beam current of a pickup tube having plural signal output electrodes.

Yet another object of the present invention is to realize an image pickup apparatus using plural pickup tubes having different characteristics, which apparatus can be effectively operated by a single beam control circuit.

According to the present invention which has been made to attain the above object, the beam current control circuit for an image pickup apparatus using plural pickup tubes or a single pickup tube having plural signal output electrodes, is constructed as follows.

The beam current control circuit is constituted of a circuit for obtaining the sum or the maximum one of signal currents out of plural signal output electrodes (in case of both plural pickup tubes and a single pickup tube), a circuit for obtaining a current corresponding to the cathode current of at least one pickup tube, and a circuit for supplying a voltage corresponding to the difference between the output currents of the above two circuits to the beam current control electrodes of the respective pickup tubes.

Moreover, in case the image pickup apparatus uses plural pickup tubes having different characteristics (especially, mutual conductances and ratios of cathode current to scanning beam current), the circuit for obtaining the current corresponding to the cathode current of the pickup tube is so constructed as to deliver the minimum one of the cathode currents of the plural pickup tubes, etc.

The above and other objects and features of the present invention will become apparent when one reads the following description of this specification in conjunction with the attached drawings.

Figure 1:
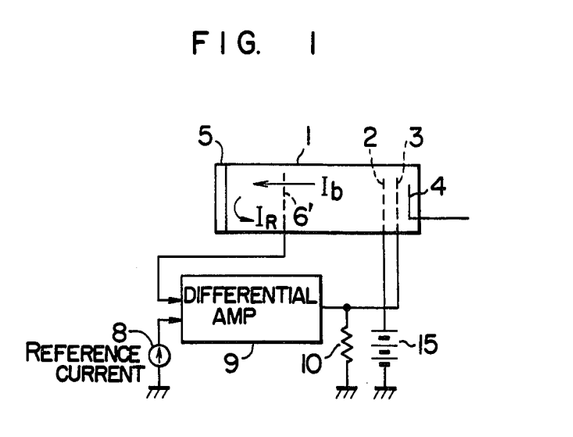
FIGS. 1 and 2 are block diagrams of beam current control circuits for an image pickup apparatus, previously developed by the Inventors of the present apparatus.

For better understanding of the present invention the beam current control circuit used for an image pickup apparatus having a single photoconductive pickup tube (developed by the inventors and filed as Japanese patent application No. 27040/73) will first be described. FIG. 1 shows one embodiment of the previous invention, adapted to expand the dynamic range of the photoconductive pickup tube. The beam current emitted by the cathode 4 of a pickup tube 1 is accelerated by an accelerating electrode 2. Most of the beam current is absorbed by the accelerating electrode 2, but the remaining portion of the beam current forms a scanning beam current $I_b$ traveling toward a target or photoconductive layer 5. A part of the scanning beam current $I_b$, having reached the target 5, is absorbed as signal current by the target 5 while the remaining portion of the scanning beam current $I_b$ forms a return beam travelling backward to the accelerating electrode 2. The return beam current is taken out by an electrode 6' provided to detect the return beam, compared with a reference current 8 and amplified by a differential amplifier 9, converted to a voltage by a resistor 10, and applied to the beam current control electrode 3.

The feedback circuit as described above is described by the following formulae (1), (2) and (3).

$$A(I_o - I_R) = \frac{E_{GI}}{R} \quad (1)$$

$$E_{GI} = \frac{1}{g_m} \cdot I_c \quad (2)$$

$$I_b = I_R + I_S \quad (3)$$

Here, A is the amplification factor or gain of the differential amplifier 9, $I_o$ the reference current, $I_R$ the return beam current, R the resistance of the resistor 10, $E_{GI}$ the voltage at the beam current control electrode 3, $g_m$ the mutual conductance of the image pickup tube, $I_c$ the cathode current, $I_b$ the scanning beam current, and $I_S$ the signal current.

In addition to the formulae (1), (2) and (3), experiments have revealed that the following equation (4) holds, connecting the cathode current $I_c$ with the scanning beam current $I_b$.

$$I_b = 1/\alpha \, I_c \quad (4),$$

where $\alpha$ is a constant.

From the above expressions (1) to (4), it follows that $$I_R = \frac{G}{1+G} I_o - \frac{1}{1+G} I_S \quad (5),$$

where G equals $ARg_m/\alpha$.

On the other hand, the signal current $I_S$ equals a finite value $I_{SM}$ determined by the characteristics of the pickup tube being used and if G is adjusted such that $1 < G$ and that $I_{SM}/(1+G)$ is sufficiently small, then the return beam current $I_R$ can be made nearly equal to the constant value $I_o$. Consequently, the control circuit is so operated as to keep the return beam current constant against the variation of the image of an object and therefore the dynamic range of the pickup tube becomes broader than that of a conventional pickup tube of fixed beam current type, thus the tendency toward beam current scarcity being effectively prevented.

In order to meet the above requirement, the pickup tube must be provided with an electrode for detecting the return beam, but the provision of the detecting electrode adds to the complexity of the electrode assembly and therefore to the cost of the pickup tube. For this reason, according to the above method, a current equivalent to the return beam current is derived from the signal current $I_S$ and the cathode current $I_c$, without resorting to a return beam detecting electrode. The derivation of the equivalent current is assured by the following equation (6) derived from the expressions (3) and (4).

$$I_R = (1/\alpha)I_c - I_S \quad (6)$$

Figure 2:
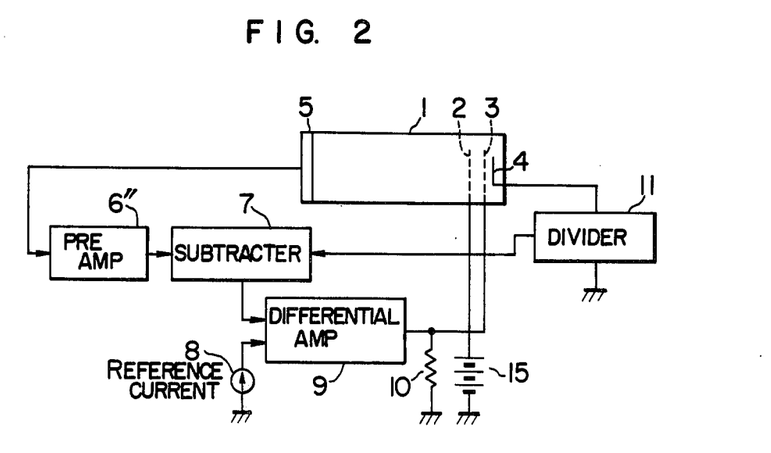

Namely, as shown in FIG. 2, the quantity $I_c/\alpha$ is obtained from the current $I_c$ through the cathode 4 of the pickup tube 1 by a current divider 11 and then the difference signal $(1/\alpha)I_c - I_S$ is divided by subtracting from $(1/\alpha)I_c$ the signal current $I_S$ picked up from the target 5 through a preamplifier 6" in a subtracter 7. The difference signal $(1/\alpha)I_c - I_S$ equals the return beam current $I_R$, as seen in the equation (6). In order to control the beam currents of plural pickup tubes or the beam current of a single pickup tube in a color camera apparatus treating plural signal currents, each pickup tube must be provided with such a control circuit as described above. However, such a constitution increases the complexity of the overall circuit and therefore is not preferable.

Figure 3:
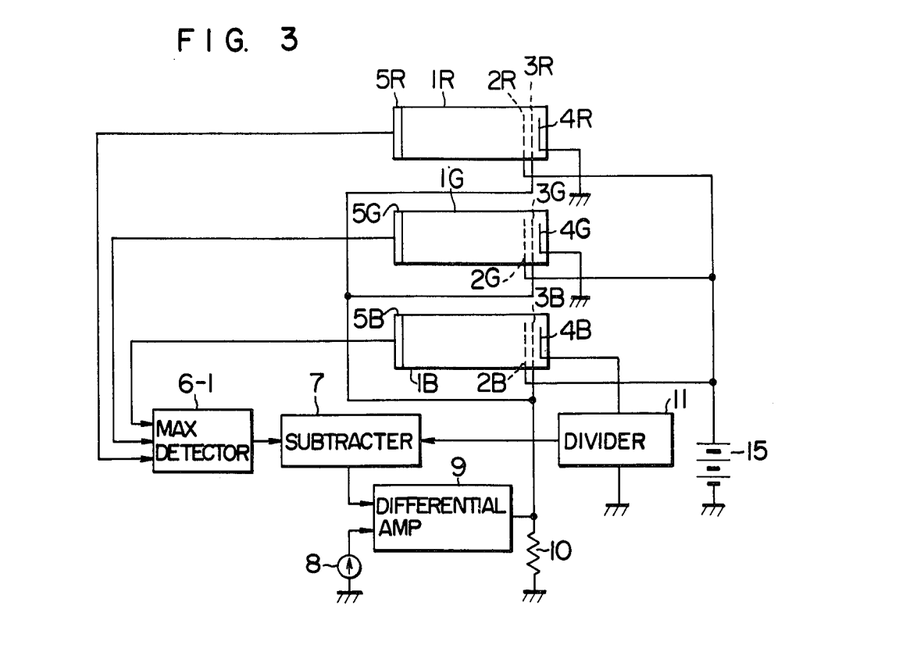
FIGS. 3, 7, 9, 11 to 15 are block diagrams of image pickup apparatus as embodiments of the present invention.

FIG. 3 is a block diagram of an image pickup apparatus as an embodiment of the present invention, using three pickup tubes and having a beam current control circuit according to the present invention. For the sake of simplicity in drawings and description, the circuits for processing the output information signal are omitted throughout the drawings since they are all well-known.

In FIG. 3, the same reference numerals are applied to like parts or components as in FIGS. 1 and 2. To specify the parallel channels for the red, green and blue component lights, the reference numerals 1, 2, 3, 4 and 5 of the pickup tubes, the accelerating electrodes, the beam current control electrodes, the cathodes and the photoconductive layers are labeled 'R', 'G' and 'B', respectively.

Figure 4:
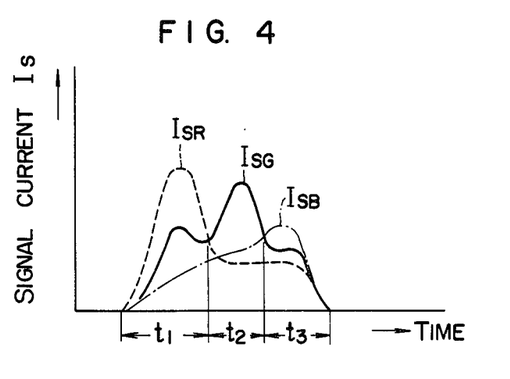
FIGS. 4 and 5 show waveforms of currents useful in explaining the operation of a maximum signal current detecting circuit used in the embodiments of the present invention.
Figure 5:
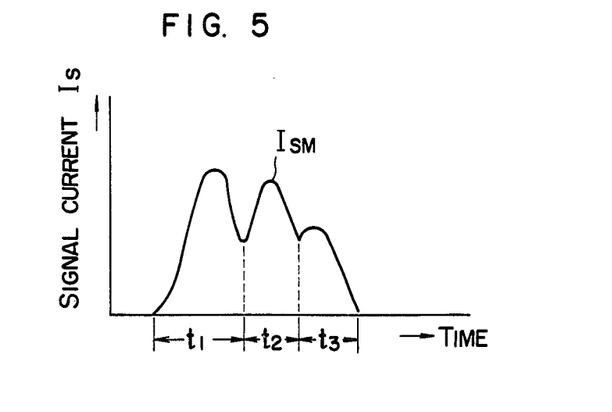
Figure 6:
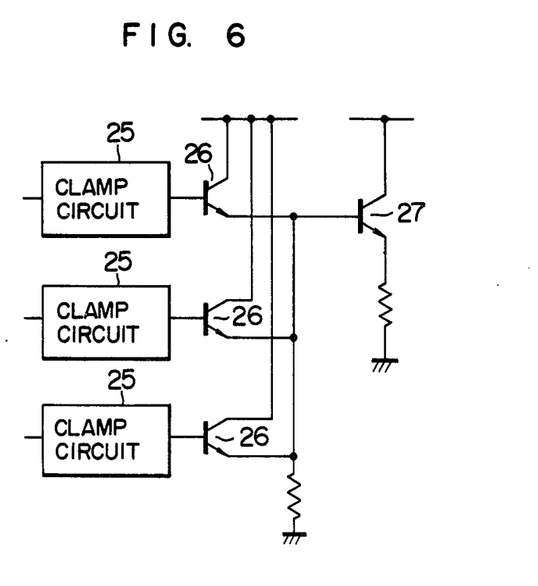
FIG. 6 shows a concrete example of the maximum signal current detecting circuit.

As shown in FIG. 3, signal currents $I_{SR}$, $I_{SG}$ and $I_{SB}$ are picked up from the photoconductive layers 5R, 5G and 5B of the pickup tubes 1R, 1G and 1B and the maximum valve $I_{SM}$ of the signal currents is detected by a maximum current detector 6-1. More particularly, let the signal currents $I_{SR}$, $I_{SG}$ and $I_{SB}$ corresponding to the red, green and blue component lights, obtained from the photoconductive layers 5R, 5G and 5B of the pickup tubes 1R, 1G and 1B, be denoted respectively by, for example, dashed curve, solid curve and long-and-short dash curve in FIG. 4. The maximum current detector 6-1 delivers the maximum one of plural input signal currents applied simultaneously. Then, the detector 6-1, when it receives the currents shown in FIG. 4, delivers the currents $I_{SR}$, $I_{SG}$ and $I_{SB}$ respectively for times $t_1$, $t_2$ and $t_3$ so that the overall output of the detector 6-1 is as indicated at $I_{SM}$ in FIG. 5. The maximum current detector 6-1 can be realized by, for example, connecting series circuits shown in FIG. 6, each being a series connection of a clamp circuit 25 and an emitter-grounded transistor 26, in parallel and by taking out the outputs of the series circuits through another transistor 27 in grounded emitter configuration. The subtractor 7 obtains the current equivalent to the return beam, i.e. equivalent current $I_{RN}$, from the maximum current $I_{SM}$ and the current $I_c/\alpha$ obtained by the current divider 11 inserted in the cathode circuit of one of the pickup tubes 1R, 1G and 1B. The equivalent current $I_{RN}$ equals $(1/\alpha)I_c - I_{SM}$. Since the equivalent current $I_{RN}$ is the minimum one of the return beam currents in the respective pickup tubes, the problem of beam current scarcity in every pickup tube can be solved by comparing the equivalent current $I_{RN}$ with the current from the reference current source 8 and amplifying in the differential amplifier 9, by converting the output current of the amplifier 9 to voltage by the resistor 10 and by applying the converted voltage to the beam current control electrodes 3R, 3G and 3B of the pickup tubes 1R, 1G and 1B, as seen in the circuit shown in FIG. 2.

Figure 8:
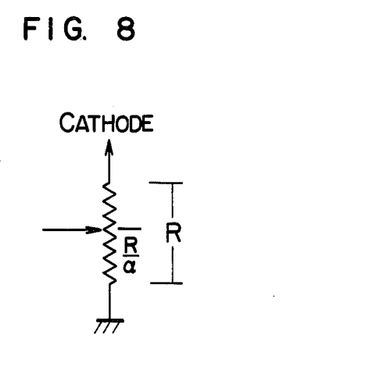
FIG. 8 shows a concrete example of a cathode current dividing circuit used in the embodiments.

In the above embodiment, the cathode current of only one pickup tube is detected. For, since the same voltage is applied to the three beam current control electrodes of the three pickup tubes, the cathode currents of the pickup tubes are equal to one another if the mutual conductances $g_m$ of and constant $\alpha$ the pickup tubes are equal to one another. It is therefore possible to generate the equivalent current $I_{RN}$ by simply detecting the cathode current of only one pickup tube. In case the mutual conductances of the pickup tubes are different from one another, it is only necessary to detect the cathode current of the pickup tube having the smallest mutual conductance. A potentiometer shown in FIG. 8 can be used as the current divider 11.

Figure 7:
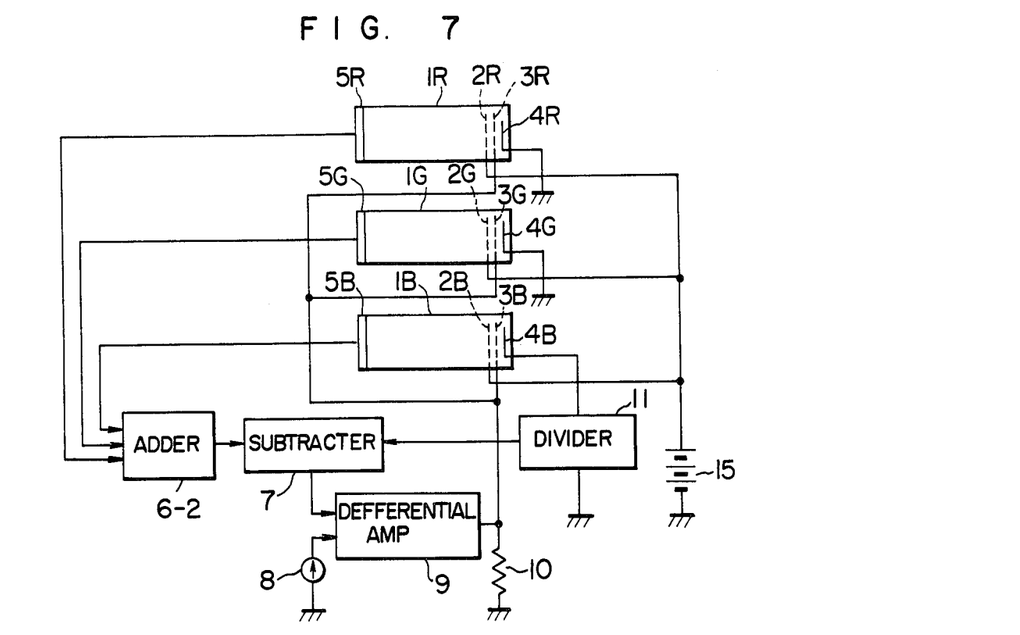

FIG. 7 shows in block diagram a color pickup apparatus as another embodiment of the present invention. This apparatus in FIG. 7 is the same as that shown in FIG. 3, except an adder 6-2 for summing the three signal currents from the photoconductive layers of the pickup tubes is used instead of the maximum current detector 6-1.

Figure 9:
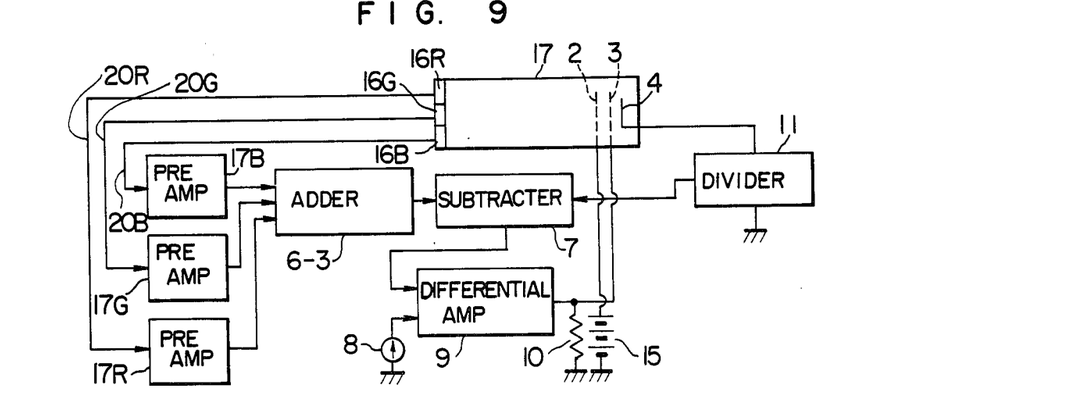

FIG. 9 shows in block diagram an image pickup apparatus as another embodiment of the present invention, the apparatus having a single pickup tube provided with plural signal output electrodes from which plural color signals are delivered. First, description will be made of the structures of the face plate and the signal delivering sections therein of a pickup tube having three kinds of separate electrodes, used in a single pickup tube color camera.

Figure 10:
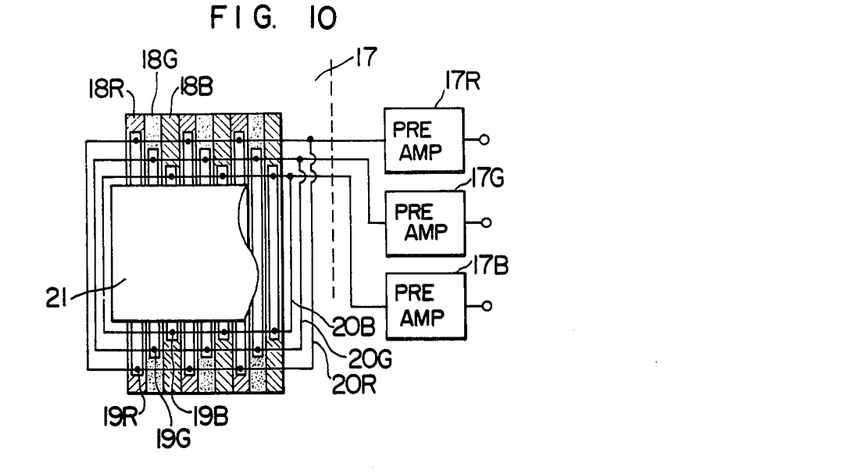
FIG. 10 is a plan view of a principal portion of a pickup tube having three kinds of signal output electrodes, illustrating in detail the photoconductive layer.

FIG. 10 is a plan of the face plate mentioned above, partially cut out and enlarged. On stripe-shaped color filters 18R, 18G and 18B respectively permeable to red, green and blue lights are disposed stripe-shaped transparent signal electrodes 19R, 19G and 19B. The respective sets of the transparent signal electrodes 19R, 19G and 19B are connected in common with busbars 20R, 20G and 20B. A photoconductive layer 21 is disposed in the vicinity of the signal electrodes. A pickup tube 1 is provided with the face plate having such a structure as described above. The signal currents are obtained from the busbars 20R, 20G and 20B of the pickup tube 1 and taken out as voltage signals from preamplifiers 17R, 17G and 17B connected with the busbars 20R, 20G and 20B. As described above, in order to control the beam current of the pickup tube, the return beam current must be exactly detected.

Although the signal currents $I_{SR}$, $I_{SG}$ and $I_{SB}$ corresponding to the red, green and blue light from an object can be obtained from the three busbars 20R, 20G and 20B of the pickup tube 1 shown in FIG. 9, the total signal current obtained from the pickup tube 1 is the sum of the respective signal currents, i.e. $I_{SR}+I_{SG}+I_{SB}$. In case of a single pickup tube color camera, the scanning beam current $I_b$ is taken out of the single pickup tube and the return beam current $I_R$ that is a part of $I_b$ not serving as the signal current absorbed in the photoconductive layer 5 or 21, is given by the following expression.

$$I_R = I_b - (I_{SR} + I_{SG} + I_{SB}) \tag{7}$$

Since the relation $I_b = (1/\alpha)I_c$ is known from the expression (4), it follows that $$I_R = (1/\alpha)I_c - (I_{SR} + I_{SG} + I_{SB}) \tag{8}$$

The three signals obtained from the three busbars 20R, 20G and 20B are respectively amplified by preamplifiers 17R, 17G and 17B and then a signal as the sum of the outputs of the preamplifiers is produced by an adder 6-3. On the other hand, another signal, i.e. the cathode current times $1/\alpha$, is derived from the current divider 11 inserted between the earth and the cathode 4 of the pickup tube 1. Accordingly, the difference signal between the sum signal and the cathode current times $1/\alpha$ signal by the subtractor 7, provides the current $I_R$ equivalent to the return beam current, given by the expression (8).

The differential amplifier 9 compares the equivalent current $I_R$ with the current from the reference current source 8. The output current of the amplifier 9 is converted to a voltage by the resistor 10 and the voltage is applied to the beam current control electrode 3. The above described constitution forms a beam current control circuit for a single pickup tube color camera, equivalent to that shown in FIG. 2.

In the above description, an image pickup tube having three groups of separate signal electrodes is taken as an example. However, it is needless to say that a similar method of controlling beam current is applicable to any pickup tube having plural groups of separate electrodes.

The foregoing embodiments are preferable especially in case the constants $\alpha$ and the mutual conductances $g_m$'s of the pickup tubes to be used are approximately equal to one another. Next, description will be made also of an embodiment of the present invention, applicable to the case where the $\alpha$ and $g_m$ are different from one another. Throughout the figures, parts having equivalent function and constitution are designated by the same reference numerals. The following description is directed to the cases in each of which three pickup tubes 1R, 1G and 1B are used. Let the mutual conductances and the constants of the respective pickup tubes 1R, 1G and 1B be denoted respectively by $g_{mR}$, $g_{mG}$ and $g_{mB}$ and $\alpha_R$, $\alpha_G$ and $\alpha_B$. Then, the currents equivalent to the return beam currents, i.e. equivalent currents $I_{RR}$, $I_{RG}$ and $I_{RB}$, with respect to the pickup tubes 1R, 1G and 1B are expressed as follows.

$$I_{RR} = \frac{g_{mR}}{\alpha_R} \cdot E - I_{SR} \tag{9}$$

$$I_{RG} = \frac{g_{mG}}{\alpha_G} \cdot E - I_{SG} \tag{10}$$

$$I_{RB} = \frac{g_{mB}}{\alpha_B} \cdot E - I_{SB} \tag{11}$$

Here, it is understood that the derivation of the single cathode current from the pickup tube 1B corresponds to the substitution of $g_{mB}/\alpha_B$ for $g_{mR}/\alpha_R$ and $g_{mG}/\alpha_G$ in the expressions (9) and (10). Accordingly, in case the values of $g_m/\alpha$ with respect to the pickup tubes 1R, 1G and 1B are different from one another, the actual equivalent currents for the pickup tubes 1R and 1G cannot be exactly detected so that beam current scarcity will tend to occur in the pickup tubes 1R and 1G.

Figure 11:
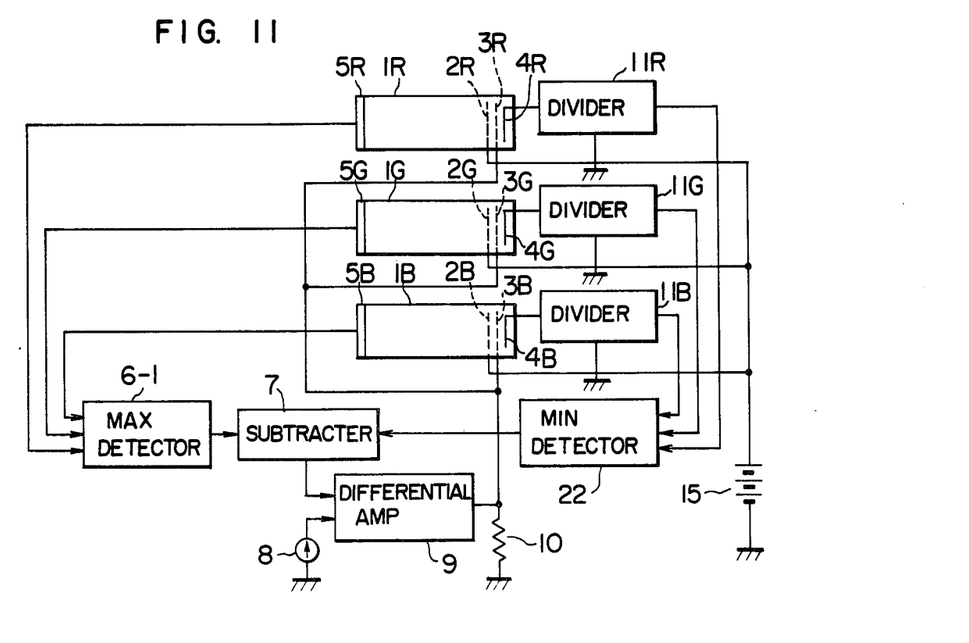

FIG. 11 shows in block diagram an image pickup apparatus, as an embodiment of the present invention, having a beam current control circuit effectively adapted for the case the $\alpha$'s of the respective pickup tubes are equal to one another while the $g_m$'s of the pickup tubes are different from one another.

As shown in FIG. 11, the signal currents $I_{SR}$, $I_{SG}$ and $I_{SB}$ derived from the photoconductive layers 5R, 5G and 5B of the three pickup tubes 1R, 1G and 1B having the same ratio $\alpha$ of cathode current $I_c$ to scanning beam current $I_b$ (see the expression (4)) are supplied to the maximum current detector 6-1, which in turn delivers a maximum value signal, i.e. maximum current signal, $I_{SM}$. Three signals $(1/\alpha)I_{cR}$, $(1/\alpha)I_{cG}$ and $(1/\alpha)I_{cB}$ obtained from the cathodes 4R, 4G and 4B of the pickup tubes 1R, 1G and 1B through respective current dividers 11R, 11G and 11B are supplied to a minimum current detector 22, which delivers a minimum value signal, i.e. minimum current signal $(1/\alpha)I_{cm}$. The signals $I_{SM}$ and $(1/\alpha)I_{cm}$ are supplied to the subtractor 7 and the subtractor 7 delivers a difference signal $((1/\alpha)I_{cm} - I_{SM})$. The difference signal is compared with the current from the reference current source 8 amplified in the differential amplifier 9. The output current of the differential amplifier 9 is converted to a voltage E by the resistor 10 and the voltage E is applied to the beam current control eletrodes 3R, 3G and 3B. Like the feedback circuit in FIG. 7 with which the expression (5) is associated, the above described feedback circuit yields the following expression.

$$I_{RE} = \frac{G}{1+G} \cdot I_o - \frac{1}{1+G} \cdot I_{SM} \quad (12),$$

where $G = A \cdot R \cdot g_{mm}/\alpha$ and $g_{mm}$ is the minimum one of the mutual conductances of the pickup tubes. As described above with FIG. 7, if $G > 1$ in this case, then $I_{RE} \approx I_o$. Then, the minimum current detector 22 selects one of the pickup tubes which draws the minimum cathode current when the same control voltage is applied to the beam current control electrodes of the pickup tubes. And the control circuit operates in such a manner that the equivalent current coincides with $I_o$ even if the signal current of the selected pickup tube equals $I_{SM}$. Consequently, beam current scarcity never occurs in the other, i.e. nonselected, pickup tubes.

Figure 12:
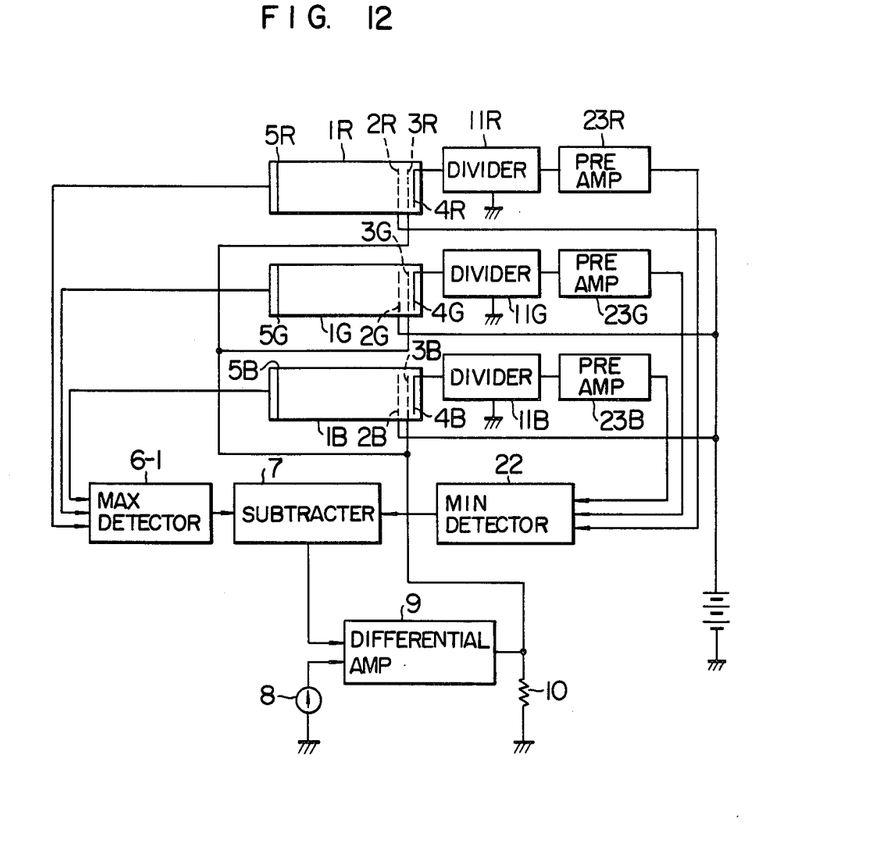

FIG. 12 shows in block diagram an image pickup apparatus as another embodiment of the present invention, having a beam current control circuit adapted for the case the $\alpha$'s as well as the $g_m$'s are different from one another.

In FIG. 12, the signal currents $I_{SR}$, $I_{SG}$ and $I_{SB}$ obtained from the photoconductive layers 5R, 5G and 5B of the three pickup tubes 1R, 1G and 1B are supplied to the maximum current detector 6-1 to obtain a maximum current signal $I_{SM}$. On the other hand, three signals $(1/\alpha)I_{cR}$, $(1/\alpha)I_{cG}$ and $(1/\alpha)I_{cB}$ obtained from the cathodes 4R, 4G and 4B of the pickup tubes 1R, 1G and 1B through the associated current dividers 11R, 11G and 11B are amplified by amplifiers 23R, 23G and 23B and then applied to the minimum current detector 22, which in turn delivers a minimum current signal $I_{bm}$. The signals $I_{SM}$ and $I_{bm}$ are applied to the subtracter 7. The subtracter 7 delivers a difference signal $(I_{bm} - I_{SM})$ and the difference signal is compared with the current from the reference current source 8 and amplified by the differential amplifier 9. The output current of the amplifier 9 is converted to a voltage E by the resistor 10 and the voltage E is applied to the beam current control electrodes 3R, 3G and 3B. As a result, the above described feedback circuit yields the following expression.

$$I_R = \frac{G}{1+G} \cdot I_o - \frac{1}{1+G} \cdot I_{SM} \quad (13),$$

where $G \geq A \cdot R \cdot g_{mm} \alpha_c$ and $\alpha_c$ is the maximum one of the $\alpha$'s of the pickup tubes 1R, 1G and 1B. In this case, the amplification factors $A_R$, $A_G$ and $A_B$ of the amplifiers 23R, 23G and 23B and the $\alpha$'s, i.e. $\alpha_R$, $\alpha_G$ and $\alpha_B$, of the pickup tubes 1R, 1G and 1B are as determined as to satisfy the following equations.

$$\alpha_R \cdot A_R = \alpha_G \cdot A_G = \alpha_B \cdot A_B = \alpha_c \quad (14)$$

Accordingly, the output current $I_{oR}$ of, for example, the amplifier 23R is given by the expression (15) below.

$$I_{oR} = A_R \cdot (1/\alpha) \cdot I_{cR} \quad (15)$$

From the expression (14) and the equation $I_B = (1/\alpha)I_c$, it follows that $$I_{oR} = A_R \cdot (\alpha_R/\alpha_c) \cdot I_{BR} \quad (16)$$

The expressions (14) and (15) yield the following equation.

$$I_{BR} = I_{cR} \quad (17)$$

In like manner, the following equations are obtained for the output currents $I_{oG}$ and $I_{oB}$ of the amplifiers 23G and 23B.

$$I_{BG} = I_{oG} \quad (18)$$

$$I_{BB} = I_{oB} \quad (19)$$

Here, $I_{BR}$, $I_{BG}$ and $I_{BB}$ are respectively the scanning beam currents of the pickup tubes 1R, 1G and 1B. It is therefore understood that the output currents of the amplifiers 23R, 23G, and 23B are equal to beam currents of $I_R$, $I_G$ and $I_B$, respectively. Consequently, the scanning beam current $I_{Bm}$, which is derived from the minimum current detector 22, is always smaller than $I_{BR}$, $I_{BG}$ and $I_{BB}$. The beam current control circuit is operated by the scanning beam current $I_{Bm}$ so that the lack of beam current never occurs in any pickup tube.

Figure 13:
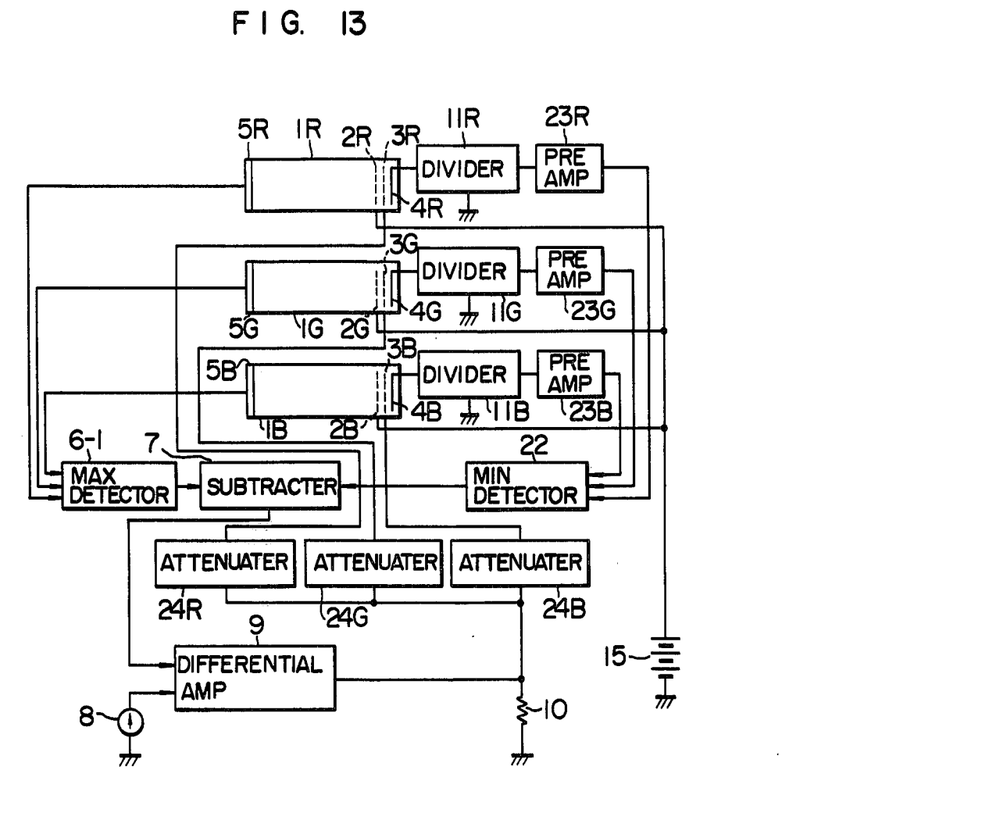

FIG. 13 shows in block diagram a beam current control circuit used in an image pickup apparatus with three pickup tubes as an embodiment of the present invention, which is well adapted to prevent the scanning beam current in any pickup tube having a smaller value of $\alpha$ or a greater value of $g_m$ from becoming excessive. Only a difference of the circuit in FIG. 13 from that in FIG. 12 is the provision of attenuators 24R, 24G and 24B through which the voltage E obtained through the conversion of the output current of the differential amplifier 9 by the resistor 10 is applied to the beam current control electrodes 3R, 3G and 3B of the pickup tubes 1R, 1G and 1B. The attenuation factors $a_R$, $a_G$ and $a_B$ of the attenuators 24R, 24G and 24B are assumed as follows.

$$a_R = (g_{mm}/g_{mR}) \cdot (\alpha_R/\alpha_c) \quad (20)$$

$$a_G = (g_{mm}/g_{mG}) \cdot (\alpha_G/\alpha_c) \quad (21)$$

$$a_B = (g_{mm}/g_{mB}) \cdot (\alpha_B/\alpha_c) \quad (22),$$

where $g_{mm}$ is the minimum one of the mutual conductances of the pickup tubes and $\alpha_c$ is the maximum one of the $\alpha_R$, $\alpha_G$ and $\alpha_B$ of the pickup tubes. Accordingly, if the control voltage E is applied to, for example, the attenuator 24R, the voltage $E_R$ applied to the beam current control electrode 3R is given by the expression below.

$$E_R = a_R \cdot E \quad (23)$$

The expression (23) and the relations $I_{cR} = g_{mR} \cdot E_R$ and $I_{BR} = (1/\alpha_R) \cdot I_{cR}$ yield the following expression.

$$I_{BR} = (1/\alpha_R) \cdot g_{mR} \cdot a_R \cdot E \quad (24)$$

It therefore follows from the expressions (20) and (24) that $$I_{BR} = (g_{mm}/\alpha_c) \cdot E \tag{25}$$

Similarly, the scanning beam currents $I_{BG}$ and $I_{BB}$ flowing when the control voltage E is applied to the beam current control electrodes 3G and 3B of the pickup tube 1G and 1B, are as follows.

$$I_{BG} = (g_{mm}/\alpha_c) \cdot E \tag{26}$$

$$I_{BB} = g_{mm}/\alpha_c \cdot E \tag{27}$$

As a result, the values $g_{mR}/\alpha_R$, $g_{mG}/\alpha_G$ and $g_{mB}/\alpha_B$ of the pickup tubes 1R, 1G and 1B can be regarded as equal to $g_{mm}/\alpha_c$. Therefore, the scanning beam currents of the pickup tubes flowing when the same voltage is applied to the attenuators, coincide with one another. In this case, the feedback circuit in FIG. 13 yields the following equation.

$$I_{RE} = \frac{G}{1+G} \cdot I_o - \frac{1}{1+G} \cdot I_{SM},$$

where $G = A \cdot R \cdot g_{mm}/\alpha_c$. When $G > 1$, $I_{RE} \approx I_o$ so that each pickup tube can be prevented from beam current scarcity as in the feedback circuit in FIG. 12.

Figure 14:
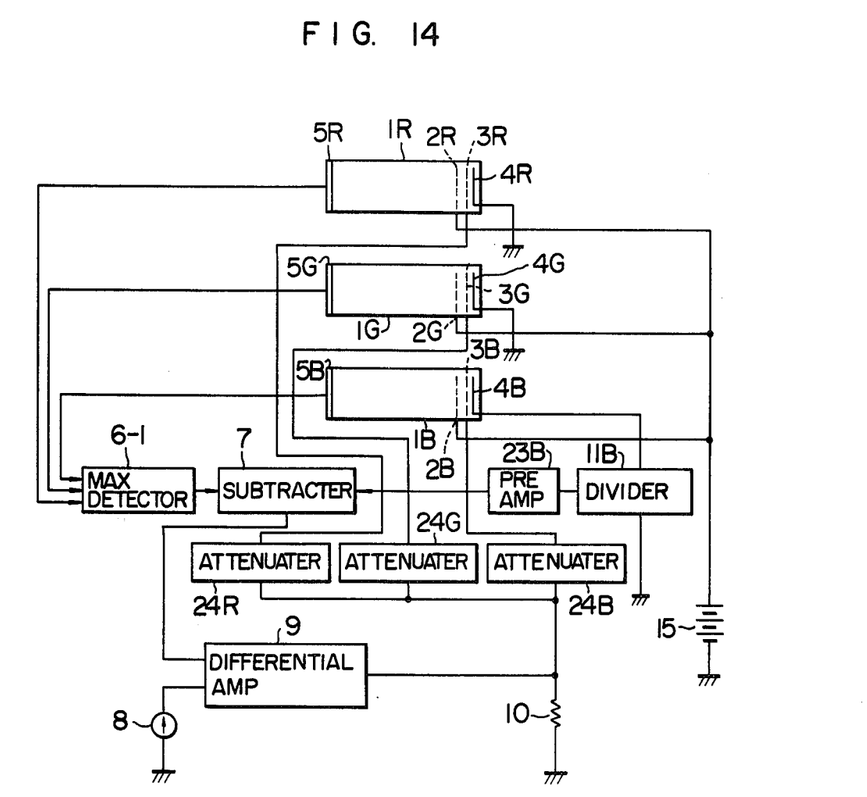

Since the scanning beam currents of the pickup tubes become equal to one another in the feedback circuit shown in FIG. 13, the cathode currents of the pickup tubes vary depending only upon the $\alpha$'s of the tubes. For example, therefore, by amplifying the signal obtained from the cathode 4B of the tube 1B through the current divider 11B by a preamplifier 23B and by applying the output of the preamplifier 23B to the subtracter 7, the minimum current detector 22 together with the dividers 11R and 11G and the preamplifiers 23R and 23G can be omitted as shown in FIG. 14. In such a case, the amplification factor $A_B$ of the preamplifier 23B has only to be determined such that $$\alpha_B \cdot A_B = \alpha_c \tag{28},$$

where $\alpha_c$ is the maximum one of the $\alpha$'s of the pickup tubes.

Figure 15:
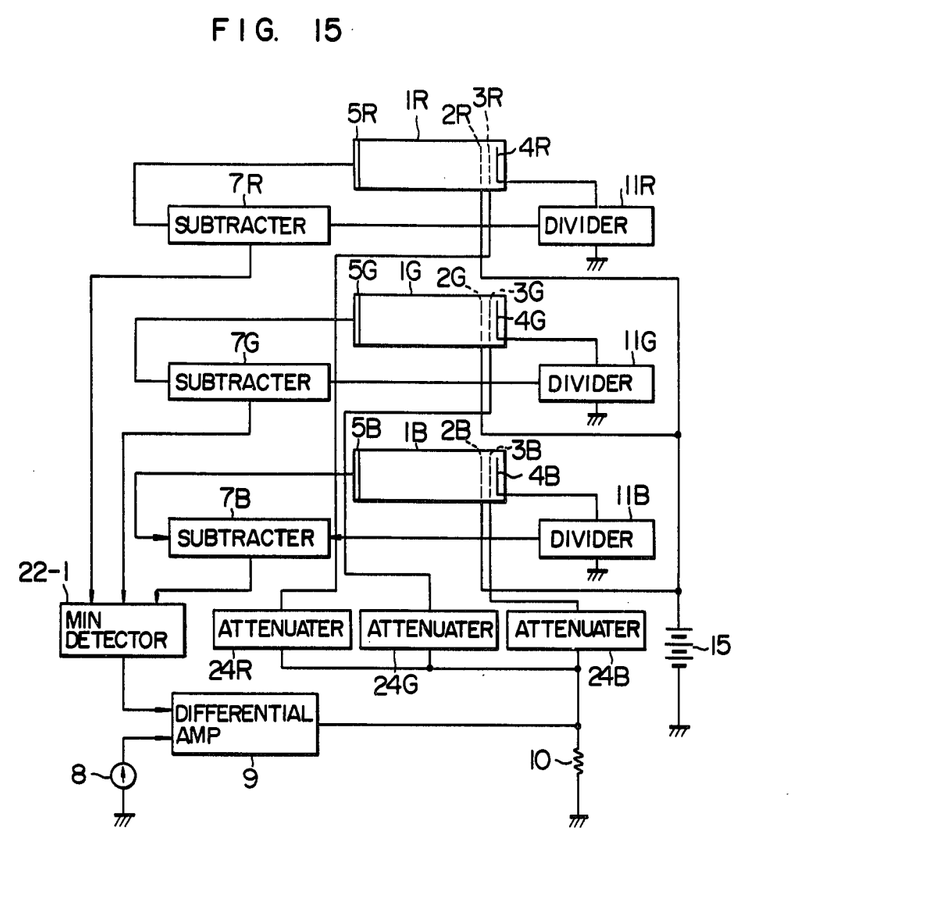

FIG. 15 shows another embodiment of the present invention, according to which the equivalent currents $I_{RR}$, $I_{RG}$ and $I_{RB}$ associated with the pickup tubes 1R, 1G and 1B are detected respectively by the subtracters 7R, 7G and 7B so that the minimum one of the equivalent currents $I_{RR}$, $I_{RG}$ and $I_{RB}$, i.e. minimum current signal $I_{Rm}$, is obtained by the minimum current detector 22-1. The minimum current signal $I_{Rm}$ is compared with the current from the reference current source 8 and then amplified, by the differential amplifier 9. The current output of the amplifier 9 is converted to a voltage E by the resistor 10 and the voltage E is applied to the attenuators 24R, 24G and 24B. The attenuation factors $\alpha_R$, $\alpha_G$ and $\alpha_B$ of the attenuators 24R, 24G and 24B in the circuit in FIG. 15 are also given respectively by the expressions (20), (21) and (22), as in the circuit in FIGS. 13 and 14.

Accordingly, if the inequalities such that $$I_{RR} \leq I_{RG} \text{ and } I_{RR} \leq I_{RB} \tag{29}$$

hold, the feedback circuit in FIG. 15 is described by the following equation.

$$I_{RR} = \frac{G}{1+G} \cdot I_o - \frac{1}{1+G} \cdot I_{SR} \tag{30},$$

where $G = A \cdot R \cdot g_{mm}/\alpha_c$.

On the other hand, it follows from the expression (1) that the input voltages $E_{R1}$, $E_{G1}$ and $E_{B1}$ applied to the attenuators 24R, 24G and 24B so as to make the return beam currents of the pickup tubes 1R, 1G and 1B equal to $I_o$, are given by the following expressions.

$$E_{R1} = A \cdot R \cdot (I_o - I_{RR}) \tag{31}$$

$$E_{G1} = A \cdot R \cdot (I_o - I_{RG}) \tag{32}$$

$$E_{B1} = A \cdot R \cdot (I_o - I_{RB}) \tag{33}$$

The expressions (29), (31), (32) and (33) yield $$E_{R1} \geq E_{G1} \text{ and } E_{R1} \geq E_{B1} \tag{34}$$

Namely, since the input terminals of the attenuators 24G and 24B respectively receive voltages higher than the voltages necessary to cause the return beam currents $I_o$ to flow through the pickup tubes 1G and 1B, no beam current scarcity occurs in the pickup tubes 1G and 1B, either.

The beam current control circuit operates to prevent beam current scarcity also in the case $I_{RG} \leq I_{RR}$ and $I_{RG} \leq I_{RB}$, or $I_{RB} \leq I_{RR}$ and $I_{RB} \leq I_{RG}$.

As described above, according to the present invention, the dynamic range of the image pickup tube of photoconductive type is broadened, that is, the lack of beam current in the pickup tube due to the increase in the incident light flux is prevented by the provision of a beam current control circuit and also the control circuit for an image pickup apparatus using plural pickup tubes or a single pickup tube having plural signal electrodes, is simplified, so that the present invention proves to have great practical merit.

What we claim is:

1. A television camera apparatus using at least one image pickup tube of photoconductive type having a beam current control circuit wherein said beam current control circuit comprises:
   (a) first means for delivering plural signal currents;
   (b) at least one current divider for taking out a current proportional to the cathode current of said pickup tube;
   (c) a current converter circuit for delivering a current on the basis of said plural signal currents and the output current of said current divider;
   (d) a reference current source;
   (e) a differential amplifier for obtaining a difference current between the output current of said current converter circuit and the current from said reference current source; and
   (f) second means for controlling the voltage applied to a beam current control electrode of said pickup tube by the output of said differential amplifier.

2. A television camera apparatus as claimed in claim 1, wherein said first means are connected to signal output electrodes of pickup tubes, each pickup tube having a single signal output electrode.

3. A television camera apparatus as claimed in claim 2, wherein said current converter circuit comprises a detector for taking out either the maximum one or the sum of said plural signal currents and a subtracter for obtaining a difference current between the output current of said current divider and the output current of said detector.

4. A television camera apparatus as claimed in claim 3, wherein the characteristics of said pickup tubes are approximate to one another, said current divider is provided for the cathode of only one of said pickup tubes, and said second means applies its control voltage respectively to said beam current control electrodes of said pickup tubes.

5. A television camera apparatus as claimed in claim 3, wherein the ratios $\alpha$ of cathode current to scanning beam current of said pickup tubes are equal to one another while the mutual conductances $g_m$ of said pickup tubes are different from one another and wherein said current divider consists of current distributors provided for the cathodes of said respective pickup tubes and a minimum current detector for delivering the minimum one of the output currents of said current distributors.

6. A television camera apparatus as claimed in claim 3, wherein the ratios $\alpha$ of cathode current to scanning beam current and the mutual conductances $g_m$ of said pickup tubes are different from one another, and wherein said current divider comprises current distributors provided for the cathode of said respective pickup tubes, current amplifier circuits for amplifying the output currents of said current distributors and a minimum current detector for delivering the minimum one of the output currents of said current amplifier circuits.

7. A television camera apparatus as claimed in claim 6, wherein said beam current control circuit further comprises attenuators each provided between said second means and said beam current control electrode.

8. A television camera apparatus as claimed in claim 3, wherein the characteristics of said pickup tubes are different from one another; said current divider is provided for the cathode of only one of said pickup tubes; a current amplifier current is provided between said current divider and said subtracter; and attenuators having different attenuation factors are provided between said second means and said beam current control electrodes of said pickup tubes.

9. A television camera apparatus as claimed in claim 2, wherein said current divider consists of current distributors provided for the cathode of said pickup tubes and said current converter circuit comprises subtracters, each obtaining difference current between the current output of each of said current distributors and the current from the associated signal output electrode, and a minimum current detector for delivering the minimum one of said output currents of said subtracters.

10. A television camera apparatus as claimed in claim 1, wherein said first means are connected to separated electrodes provided in a single pickup tube and said current converter circuit comprises a detector for taking out either the maximum one or the sum of said plural signal currents and a subtracter for obtaining a difference current between the output current of said current divider and the output current of said detector.

11. A television camera apparatus using at least one image pickup tube of photoconductive type having a beam current control circuit, wherein said beam current control circuit comprises:

(a) first means for obtaining plural output signals from said image pickup tube, (b) second means for obtaining a signal which is proportional to the cathode current of at least said one image pickup tube, (c) third means for obtaining a signal on the basis of the output signal of said second means and said plural output signals, (d) fourth means for generating a reference signal, (e) fifth means for comparing the output signal of said third means with said reference signal, (f) sixth means for supplying a beam current control electrode of said image pickup tube with the output signal of said fifth means.

12. A television camera apparatus as claimed in claim 11, wherein said first means are connected to signal output electrodes of image pickup tubes, each pickup tube having a single signal output electrode.

13. A television camera apparatus as claimed in claim 12, wherein said third means comprises a first detector for taking out either the maximum one or the sum of said plural output signals and a subtracter for obtaining a difference signal between the output signal of said first detector and the output signal of said second means.

14. A television camera apparatus as claimed in claim 13, wherein said second means is provided for the cathode of only one of said image pickup tubes, and said sixth means applies the output signal of said fifth means respectively to said beam current control electrodes of said image pickup tubes.

15. A television camera apparatus as claimed in claim 14, wherein the characteristics of said image pickup tubes are approximate to one another.

16. A television camera apparatus as claimed in claim 14, wherein the characteristics of said pickup tubes are different from one another, an amplifier circuit is provided between said second means and said subtracter, and attenuators are provided between said sixth means and said beam current control electrodes of said image pickup tubes.

17. A television camera apparatus as claimed in claim 13, wherein said second means comprises dividers provided for the cathodes of said respective image pickup tubes and a second detector for taking out the minimum one of the output signals of said dividers.

18. A television camera apparatus as claimed in claim 17, wherein the ratios $\alpha$ of cathode current to scanning beam current of said image pickup tubes are equal to one another while the mutual conductances $g_m$ of said image pickup tubes are different from one another.

19. A television camera apparatus as claimed in claim 17, wherein the characteristics of said image pickup tubes are different from one another, said second means further comprises amplifiers for amplifying the output signals of said dividers, which are provided between said dividers and said second detector.

20. A television camera apparatus as claimed in claim 19, wherein attenuators are provided between said sixth means and said beam current control electrodes of said image pickup tubes.

21. A television camera apparatus as claimed in claim 11, wherein said first means is connected to separated electrodes provided in a single pickup tube and said third means comprises a detector for taking out either the maximum one or the sum of said plural output signals and a subtracter for obtaining a difference signal between the output signal of said detector and the output signal of said second means.

* * * * *